US012746736B2

(12) United States Patent
Wu et al.

(10) Patent No.: US 12,746,736 B2
(45) Date of Patent: Sep. 29, 2026

(54) PRE-MOLD DIRECT BOND COPPER (DBC) SUBSTRATE AND MANUFACTURING METHOD THEREOF

(71) Applicant: TONG HSING ELECTRONIC INDUSTRIES, LTD., Taipei City (TW)

(72) Inventors: Jia-Yi Wu, Taipei City (TW); Yan-Wei Chen, Taipei City (TW)

(73) Assignee: TONG HSING ELECTRONIC INDUSTRIES, LTD., Taipei City (TW)

( * ) Notice: Subject to any disclaimer, the term of this patent is extended or adjusted under 35 U.S.C. 154(b) by 528 days.

(21) Appl. No.: 18/470,391

(22) Filed: Sep. 19, 2023

(65) Prior Publication Data

US 2025/0001730 A1 Jan. 2, 2025

(30) Foreign Application Priority Data

Jun. 29, 2023 (TW) ................................ 112124185

(51) Int. Cl.

| | |
|---|---|
| ***B32B 9/00*** | (2006.01) |
| ***B32B 3/06*** | (2006.01) |
| ***B32B 3/10*** | (2006.01) |
| ***B32B 15/04*** | (2006.01) |
| ***B32B 15/20*** | (2006.01) |
| ***B32B 38/00*** | (2006.01) |
| ***B32B 38/16*** | (2006.01) |

(52) U.S. Cl.

CPC ................ *B32B 9/005* (2013.01); *B32B 3/06* (2013.01); *B32B 3/10* (2013.01); *B32B 15/043* (2013.01); *B32B 15/20* (2013.01); *B32B 38/0012* (2013.01); *B32B 38/162* (2013.01); *B32B 2307/538* (2013.01); *B32B 2310/14* (2013.01)

(58) Field of Classification Search

CPC ..................................................... B32B 15/20

See application file for complete search history.

(56) References Cited

U.S. PATENT DOCUMENTS 10,204,871 B2 2/2019 Hinata
11,587,861 B2 2/2023 Nogawa

*Primary Examiner* — Ian A Rummel
(74) *Attorney, Agent, or Firm* — Li & Cai Intellectual Property Office

(57) ABSTRACT

A pre-mold direct bond copper substrate includes a ceramic board, a copper layer eutectic-bonded onto a surface of the ceramic board, and a pre-encapsulation layer formed on the ceramic board. A part of the surface of the ceramic board not in contact with the copper layer is defined as a layout region. The pre-encapsulation layer is formed on the layout region and covers the copper layer, so that at least part of an outer surface of the copper layer is exposed from the pre-encapsulation layer. A coefficient of thermal expansion (CTE) of the pre-encapsulation layer is between a CTE of the ceramic board and a CTE of the copper layer. A top side of the pre-encapsulation layer is not lower than the outer surface of the copper layer, and a surrounding lateral side of the pre-encapsulation layer is flush with a surrounding lateral surface of the ceramic board.

9 Claims, 9 Drawing Sheets

PRE-MOLD DIRECT BOND COPPER (DBC) SUBSTRATE AND MANUFACTURING METHOD THEREOF

CROSS-REFERENCE TO RELATED PATENT APPLICATION

This application claims the benefit of priority to Taiwan Patent Application No. 112124185, filed on Jun. 29, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is “prior art” to the disclosure described herein. All references cited and discussed in this specification are incorporated herein by reference in their entireties and to the same extent as if each reference was individually incorporated by reference.

FIELD OF THE DISCLOSURE

The present disclosure relates to a direct bond copper (DBC) substrate, and more particularly to a pre-mold DBC substrate and a manufacturing method thereof.

BACKGROUND OF THE DISCLOSURE

A conventional DBC substrate includes a ceramic board and a copper layer that is formed on the ceramic board. Since a coefficient of thermal expansion (CTE) of the ceramic board and a CTE of the copper layer have a large difference, a temperature of the conventional DBC substrate can easily become a cause for the occurrence of a warpage issue of the copper layer or a stress concentration issue of the ceramic board, thereby reducing reliability and durability of the conventional DBC substrate.

SUMMARY OF THE DISCLOSURE

In response to the above-referenced technical inadequacies, the present disclosure provides a pre-mold direct bond copper (DBC) substrate and a manufacturing method thereof for effectively improving on the issues associated with conventional DBC substrates.

In order to solve the above-mentioned problems, one of the technical aspects adopted by the present disclosure is to provide a pre-mold DBC substrate, which includes a ceramic board, a first copper layer, a second copper layer, and a pre-encapsulation layer. The ceramic board has a first surface, a second surface opposite to the first surface, and a surrounding lateral surface that is connected to the first surface and the second surface. The first copper layer is eutectic-bonded to the first surface. The first copper layer has a bonding surface arranged away from the first surface, and a part of the first surface not in contact with the first copper layer is defined as a layout region. The second copper layer is eutectic-bonded to the second surface. Moreover, a volume of the first copper layer is less than or equal to 80% of a volume of the second copper layer. The pre-encapsulation layer is formed on the layout region in a molding manner to cover the first copper layer. At least part of the bonding surface of the first copper layer is exposed from the pre-encapsulation layer. Moreover, a coefficient of thermal expansion (CTE) of the pre-encapsulation layer is between a CTE of the ceramic board and a CTE of the first copper layer. The pre-encapsulation layer has a top side and a surrounding lateral side that is connected to the top side. The top side of the pre-encapsulation layer is higher than or coplanar with the bonding surface of the first copper layer relative to the first surface, and the surrounding lateral side of the pre-encapsulation layer is flush with the surrounding lateral surface of the ceramic board.

In order to solve the above-mentioned problems, another one of the technical aspects adopted by the present disclosure is to provide a manufacturing method of a pre-mold DBC substrate, which includes a preparing step, a DBC step, a plasma cleaning step, and a pre-encapsulation step. The preparing step is implemented by providing a ceramic board. The ceramic board has a first surface, a second surface opposite to the first surface, and a surrounding lateral surface that is connected to the first surface and the second surface. The DBC step is implemented by forming a first copper layer onto the first surface of the ceramic board in a eutectic-bonded manner. The first copper layer has a bonding surface arranged away from the first surface, and a part of the first surface not in contact with the first copper layer is defined as a layout region. The plasma cleaning step is implemented by cleaning the ceramic board and the first copper layer. The pre-encapsulation step is implemented by forming a pre-encapsulation layer on the layout region in a molding manner. The pre-encapsulation layer covers the first copper layer, and at least part of the bonding surface of the first copper layer is exposed from the pre-encapsulation layer. Moreover, a CTE of the pre-encapsulation layer is between a CTE of the ceramic board and a CTE of the first copper layer.

In order to solve the above-mentioned problems, yet another one of the technical aspects adopted by the present disclosure is to provide a pre-mold DBC substrate, which includes a ceramic board, a first copper layer, and a pre-encapsulation layer. The ceramic board has a first surface, a second surface opposite to the first surface, and a surrounding lateral surface that is connected to the first surface and the second surface. The first copper layer is eutectic-bonded to the first surface. The first copper layer has a bonding surface arranged away from the first surface, a part of the first surface not in contact with the first copper layer is defined as a layout region, and the ceramic board is provided without any copper layer on the second surface thereof. The pre-encapsulation layer is formed on the layout region in a molding manner to cover the first copper layer. At least part of the bonding surface of the first copper layer is exposed from the pre-encapsulation layer, and a CTE of the pre-encapsulation layer is between a CTE of the ceramic board and a CTE of the first copper layer. The pre-encapsulation layer has a top side and a surrounding lateral side that is connected to the top side, and the top side of the pre-encapsulation layer is higher than or coplanar with the bonding surface of the first copper layer relative to the first surface, and the surrounding lateral side of the pre-encapsulation layer is flush with the surrounding lateral surface of the ceramic board.

Therefore, in any one of the pre-mold DBC substrate and the manufacturing method provided by the present disclosure, the pre-encapsulation layer can be formed under a specific condition (e.g., the volume of the first copper layer being less than or equal to 80% of the volume of the second copper layer; or, the ceramic board being eutectic-bonded to only the first copper layer), such that the characteristic of the pre-encapsulation layer (e.g., the CTE of the pre-encapsulation layer being between the CTE of the ceramic board and the CTE of the first copper layer) enables the first copper layer (and/or the second copper layer) to avoid having a warpage and enables the ceramic board to avoid having a stress concentration, thereby increasing the reliability and durability of the pre-mold DBC substrate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
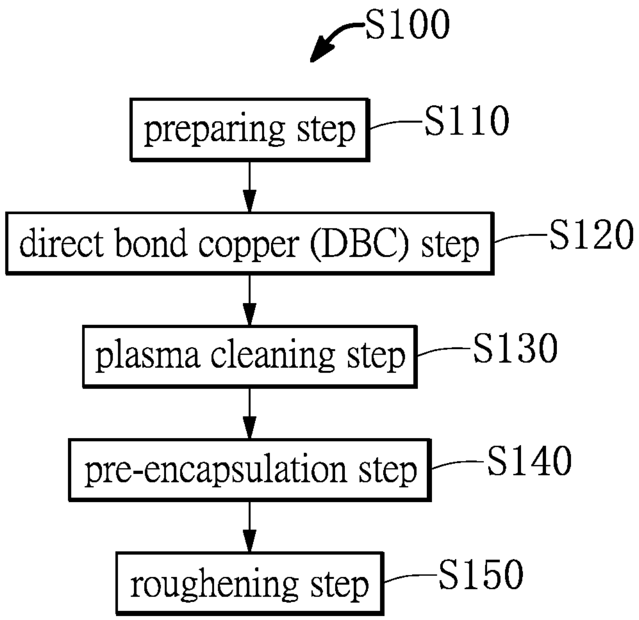
FIG. 1 is a flowchart of a manufacturing method of a pre-mold direct bond copper (DBC) substrate according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure is provided. As shown in FIG. 1, the present embodiment provides a manufacturing method S100 of a pre-mold direct bond copper (DBC) substrate, which sequentially includes (or implements) a preparing step S110, a DBC step S120, a plasma cleaning step S130, a pre-mold encapsulation step S140, and a roughening step S150.

The steps S110 to S150 of the manufacturing method S100 in the present embodiment are sequentially described, but the present disclosure is not limited thereto. For example, in other embodiments of the present disclosure not shown in the drawings, the steps S110 to S150 of the manufacturing method S100 can be increased, decreased, or adjusted according to design requirements (e.g., the roughening step S150 can be omitted according to design requirements).

Figure 2:
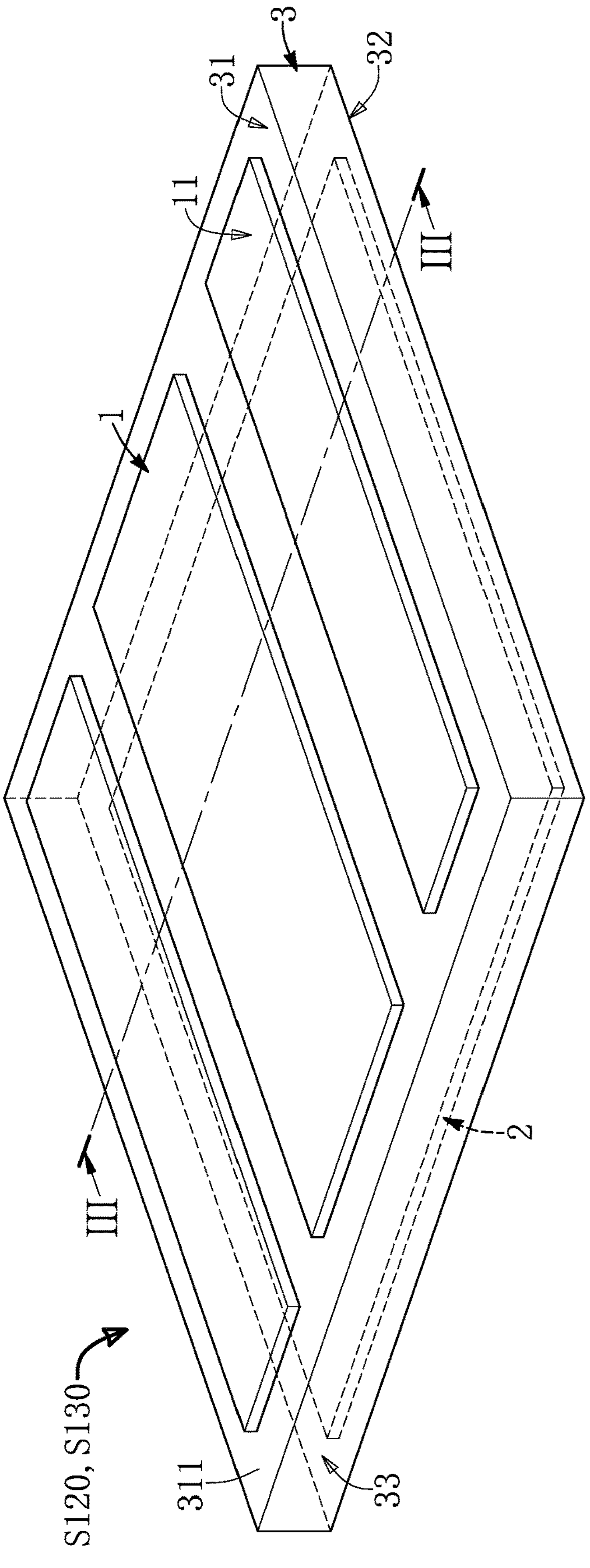
FIG. 2 is a schematic perspective view showing a DBC step and a plasma cleaning step of FIG. 1.
Figure 3:
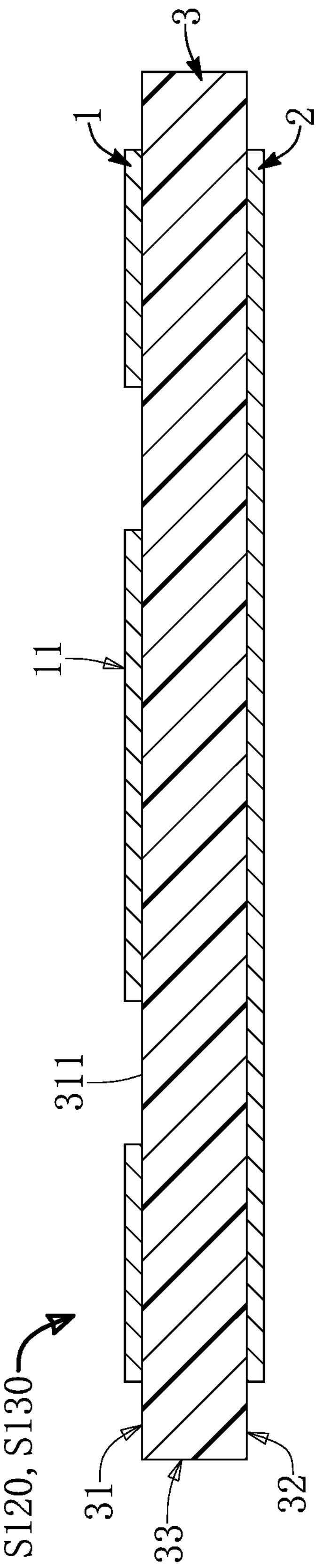
FIG. 3 is a schematic cross-sectional view taken along line III-III of FIG. 2.

As shown in FIG. 1 to FIG. 3, the preparing step S110 is implemented by providing a ceramic board 3. The ceramic board 3 has a first surface 31, a second surface 32 opposite to the first surface 31, and a surrounding lateral surface 33 that is connected to the first surface 31 and the second surface 32. In the present embodiment, the first surface 31 and the second surface 32 are parallel to each other, and two opposite edges of the surrounding lateral surface 33 are perpendicularly connected to a peripheral edge of the first surface 31 and a peripheral edge of the second surface 32. Moreover, the ceramic board 3 is made of a ceramic material that can be adjusted or changed according to design requirements, and the present disclosure is not limited thereto.

As shown in FIG. 1 to FIG. 3, the DBC step S120 is implemented by respectively forming a first copper layer 1 and a second copper layer 2 onto the first surface 31 and the second surface 32 of the ceramic board 3 in a eutectic-bonded manner. The first copper layer 1 has a bonding surface 11 arranged away from the first surface 31, a part of the first surface 31 not in contact with the first copper layer 1 is defined as a layout region 311, and a volume of the first copper layer 1 is less than or equal to 80% of a volume of the second copper layer 2.

It should be noted that the eutectic-bonded manner for bonding the first copper layer 1 and the second copper layer 2 onto the ceramic board 3 is not described in detail, and a shape of any one of the first copper layer 1 and the second copper layer 2 can be adjusted or changed according to design requirements. However, any step not implemented for eutectic-bonding a ceramic board and a copper layer is different from the DBC step S120 provided by the present embodiment.

As shown in FIG. 1 to FIG. 3, the plasma cleaning step S130 is implemented by cleaning the ceramic board 3, the first copper layer 1, and the second copper layer 2. In other words, a cleaning process in the plasma cleaning step S130 is achieved in a plasma manner, but the present disclosure is not limited thereto.

Figure 4:
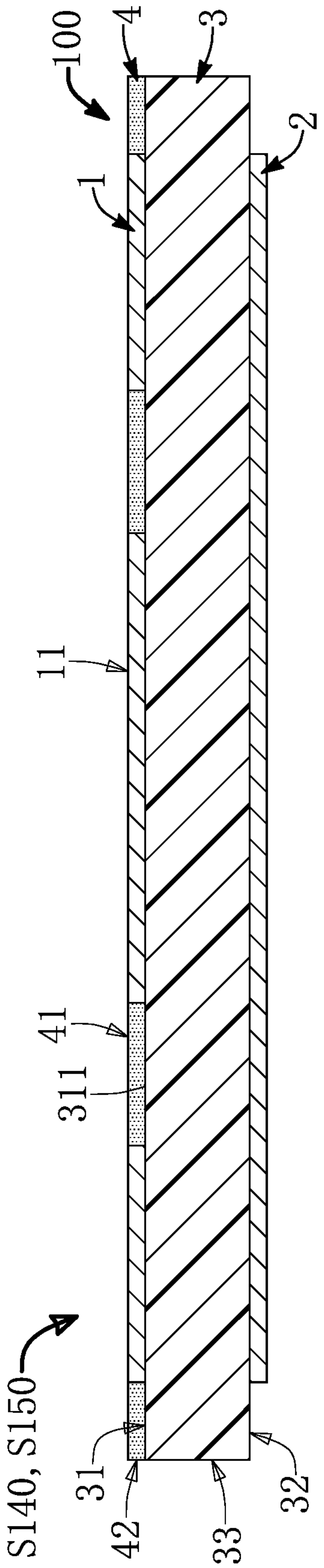
FIG. 4 is a schematic cross-sectional view showing a pre-encapsulation step and a roughening step of FIG. 1.

As shown in FIG. 1 and FIG. 4, the pre-encapsulation step S140 is implemented by forming a pre-encapsulation layer 4 on the layout region 311 in a molding manner. The pre-encapsulation layer 4 covers the first copper layer 1, and at least part of the bonding surface 11 of the first copper layer 1 is exposed from the pre-encapsulation layer 4. Accordingly, after the pre-encapsulation step S140 is implemented, the first copper layer 1, the second copper layer 2, the ceramic board 3, and the pre-encapsulation layer 4 are jointly defined as a pre-mold DBC substrate 100. Moreover, a coefficient of thermal expansion (CTE) of the pre-encapsulation layer 4 is between a CTE of the ceramic board 3 and a CTE of the first copper layer 1.

Specifically, in the pre-encapsulation step S140 of the present embodiment, the pre-encapsulation layer 4 has a top side 41 and a surrounding lateral side 42 that is connected to the top side 41. The top side 41 of the pre-encapsulation layer 4 is higher than or coplanar with the bonding surface 11 of the first copper layer 1 relative to the first surface 31 (e.g., the top side 41 of the pre-encapsulation layer 4 can be limited to being coplanar with the bonding surface 11 of the first copper layer 1), and the surrounding lateral side 42 of the pre-encapsulation layer 4 is flush with (or coplanar with) the surrounding lateral surface 33 of the ceramic board 3.

As shown in FIG. 1 and FIG. 4, the roughening step S150 is implemented by roughening at least one of the top side 41 and the surrounding lateral side 42 of the pre-encapsulation layer 4 to have an average roughness (Ra) of at least 0.8 μm, thereby effectively increasing a bonding strength between the pre-encapsulation layer 4 and an encapsulation body (not shown in the drawings) when the pre-mold DBC substrate 100 is applied in a subsequent package process.

In summary, in the manufacturing method S100 provided by the present embodiment, the pre-encapsulation step S140 can be implemented under a specific condition (e.g., the volume of the first copper layer 1 being less than or equal to 80% of the volume of the second copper layer 2) to form the pre-encapsulation layer 4, such that the characteristic of the pre-encapsulation layer 4 (e.g., the CTE of the pre-encapsulation layer 4 being between the CTE of the ceramic board 3 and the CTE of the first copper layer 1) enables the first copper layer 1 or the second copper layer 2 to avoid having a warpage and enables the ceramic board 3 to avoid having a stress concentration, thereby increasing the reliability and durability of the pre-mold DBC substrate 100.

In addition, the above description substantially describes the steps S110 to S150 of the manufacturing method S100, and the following description substantially describes the specific structure of the pre-mold DBC substrate 100. In the present embodiment, the pre-mold DBC substrate 100 is preferably manufactured by implementing the above manufacturing method S100, but the present disclosure is not limited thereto.

As shown in FIG. 4, the pre-mold DBC substrate 100 includes a ceramic board 3, a first copper layer 1, a second copper layer 2, and a pre-encapsulation layer 4. The first copper layer 1 and the second copper layer 2 are respectively formed on two opposite sides of the ceramic board 3, and the pre-encapsulation layer 4 covers a smaller one of the first copper layer 1 and the second copper layer 2. Moreover, (an outer surface of) the ceramic board 3 has a first surface 31, a second surface 32 that is opposite (and parallel) to the first surface 31, and a surrounding lateral surface 33 that is connected to the first surface 31 and the second surface 32.

The first copper layer 1 is eutectic-bonded to the first surface 31 of the ceramic board 1, the second copper layer 2 is eutectic-bonded to the second surface 32 of the ceramic board 1, and a volume of the first copper layer 1 is less than or equal to 80% of a volume of the second copper layer 2. The first copper layer 1 has a bonding surface 11 (e.g., a top surface of the first copper layer 1 shown in FIG. 4) arranged away from the first surface 31, and a part of the first surface 31 not in contact with the first copper layer 1 is defined as a layout region 311.

Moreover, a coefficient of thermal expansion (CTE) of the pre-encapsulation layer 4 (e.g., the CTE of the pre-encapsulation layer 4 is within a range from 10 to 12) is between a CTE of the ceramic board 3 (e.g., the CTE of the ceramic board 3 is within a range from 5 to 8) and a CTE of the first copper layer 1 (e.g., the CTE of the first copper layer 1 is within a range from 16 to 17), so that the pre-encapsulation layer 4 can provide a buffering function to effectively reduce damage of ceramic board 3 caused from a difference between the volumes of the first copper layer 1 and the second copper layer 2. In addition, the material(s) of the pre-encapsulation layer 4 can be identical to or different from that of an encapsulation body (not shown in the drawings) when the pre-mold DBC substrate 100 is applied in a subsequent package process.

The pre-encapsulation layer 4 in the present embodiment is formed on the layout region 311 in a molding manner and covers the first copper layer 1, and at least part of the bonding surface 11 of the first copper layer 1 is exposed from the pre-encapsulation layer 4. In the present embodiment, an entirety of the bonding surface 11 of the first copper layer 1 is exposed from the pre-encapsulation layer 4, and other surfaces of the first copper layer 1 are embedded in the pre-encapsulation layer 4.

Specifically, the pre-encapsulation layer 4 has a top side 41 and a surrounding lateral side 42 that is connected to the top side 41. The top side 41 of the pre-encapsulation layer 4 is higher than or coplanar with the bonding surface 11 of the first copper layer 1 relative to the first surface 31 (e.g., the top side 41 of the pre-encapsulation layer 4 can be limited to being coplanar with the bonding surface 11 of the first copper layer 1), and the surrounding lateral side 42 of the pre-encapsulation layer 4 is flush with the surrounding lateral surface 33 of the ceramic board 3. In other words, the pre-encapsulation layer 4 and the first copper layer 1 provided by the present embodiment are complementary in shape for being jointly formed as a single-layer structure.

At least one of the top side 41 and the surrounding lateral side 42 of the pre-encapsulation layer 4 has an average roughness (Ra) of at least 0.8 μm, but the present disclosure is not limited thereto. In the present embodiment, an entirety of the outer surface (e.g., the top side 41 and the surrounding lateral side 42) of the pre-encapsulation layer 4 can be formed with the average roughness (Ra) of at least 0.8 μm, thereby effectively increasing a bonding strength between the pre-encapsulation layer 4 and the encapsulation body when the pre-mold DBC substrate 100 is applied in the subsequent package process.

Second Embodiment

Figure 5:
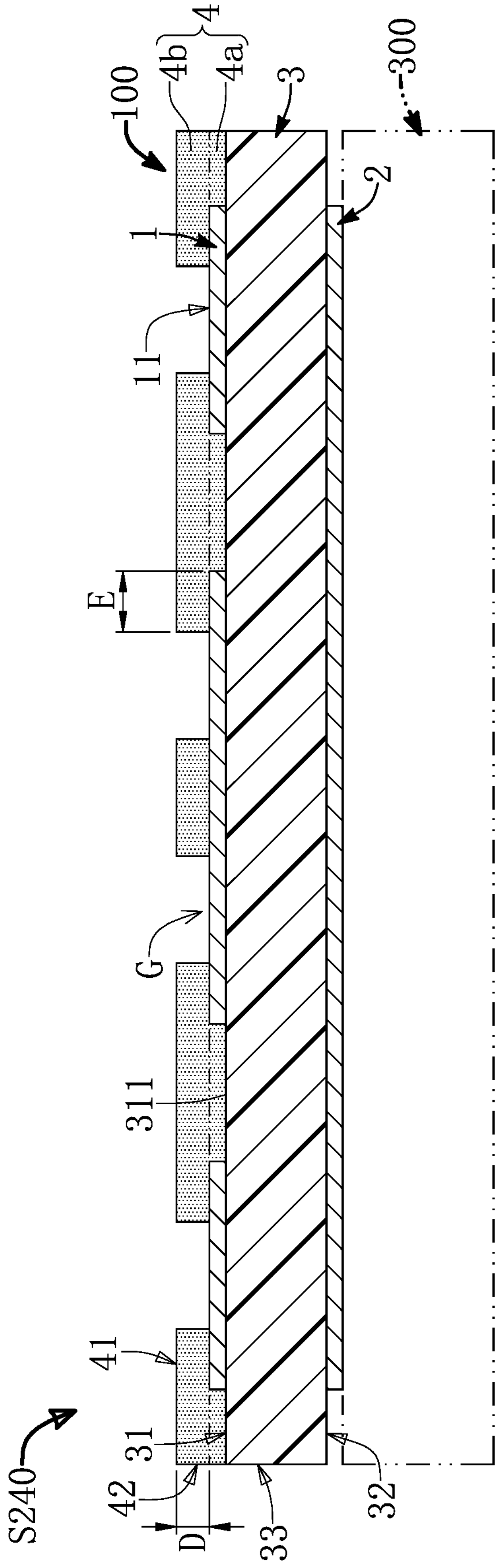
FIG. 5 is a schematic cross-sectional view showing the pre-encapsulation step according to a second embodiment of the present disclosure.

Referring to FIG. 5, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the pre-encapsulation step S240 provided by the present embodiment, the pre-encapsulation layer 4 protrudes from the bonding surface 11 to cover a part of the bonding surface 11, so that the pre-encapsulation layer 4 and the bonding surface 11 jointly define a plurality of accommodating slots G for respectively accommodating solders or sintered silvers (not shown in the drawings), but the present disclosure is not limited thereto. The top side 41 of the pre-encapsulation step 4 is spaced apart from the bonding surface 11 by a distance D that is less than or equal to 100 μm. Furthermore, the distance D is preferably less than 30 μm, but the present disclosure is not limited thereto.

Specifically, the pre-encapsulation layer 4 of the pre-mold DBC substrate 100 in the present embodiment includes a covering body 4*a* and a frame body 4*b* that extends from the covering body 4*a* and that protrudes from the bonding surface 11. The covering body 4*a* is formed on the layout region 311 and covers the first copper layer 1. In other words, the structure (or shape) of the covering body 4*a* is substantially identical to that of the pre-encapsulation layer 4 provided by the first embodiment.

The frame body 4*b* has the top side 41, and the top side 41 of the frame body 4*b* is spaced apart from the bonding surface 11 by the distance D that is less than or equal to 100 μm. Lateral sides of the covering body 4*a* and lateral sides of the frame body 4*b* are jointly defined as the surrounding lateral side 42 of the pre-encapsulation layer 4, and are flush with the surrounding lateral surface 33 of the ceramic board 3.

Moreover, the frame body 4*b* covers the part of the bonding surface 11 (e.g., the frame body 4*b* extends along the bonding surface 11 by a distance E), so that the frame body 4*b* and the bonding surface 11 jointly define the accommodating slots G for respectively accommodating solders or sintered silvers. The second copper layer 2 is configured to be connected to a heatsink 300. It should be noted that the accommodating slots G provided by the present embodiment have a same depth, but the present disclosure is not limited thereto. For example, in other embodiments of the present disclosure not shown in the drawings, the accommodating slots G can have different depths. In other words, the distance D between the top side 41 of the frame body 4*b* and the bonding surface 11 can have more than one value according to design requirements.

Third Embodiment

Figure 6:
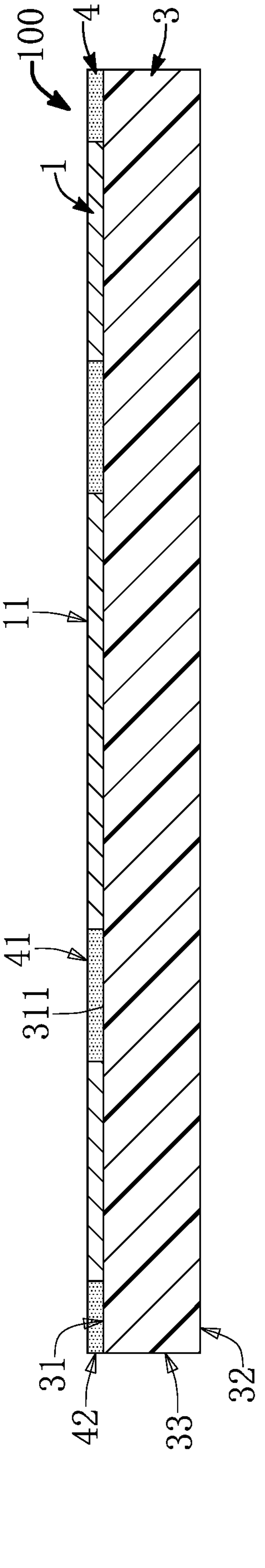
FIG. 6 is a schematic cross-sectional view of the pre-mold DBC substrate according to a third embodiment of the present disclosure.
Figure 7:
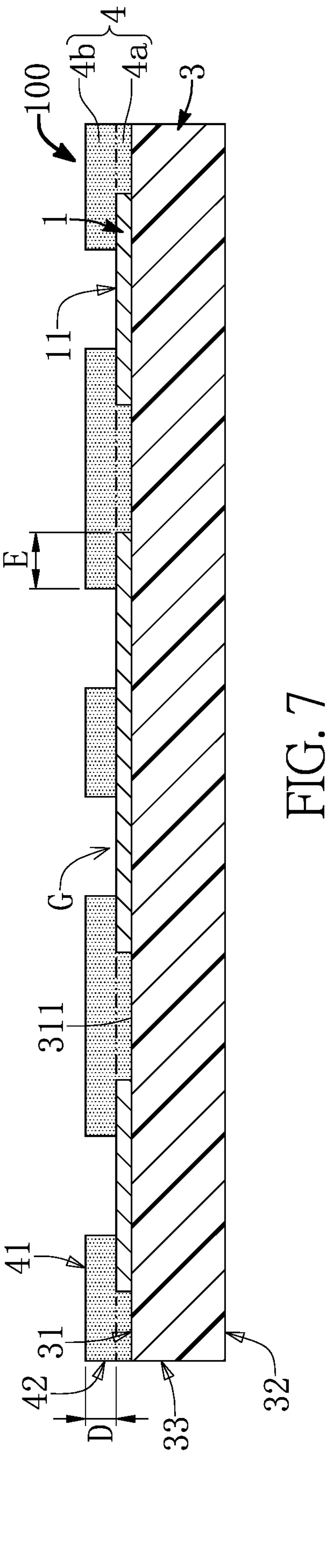
FIG. 7 is a schematic cross-sectional view of the pre-mold DBC substrate in another configuration according to the third embodiment of the present disclosure.
Figure 8:
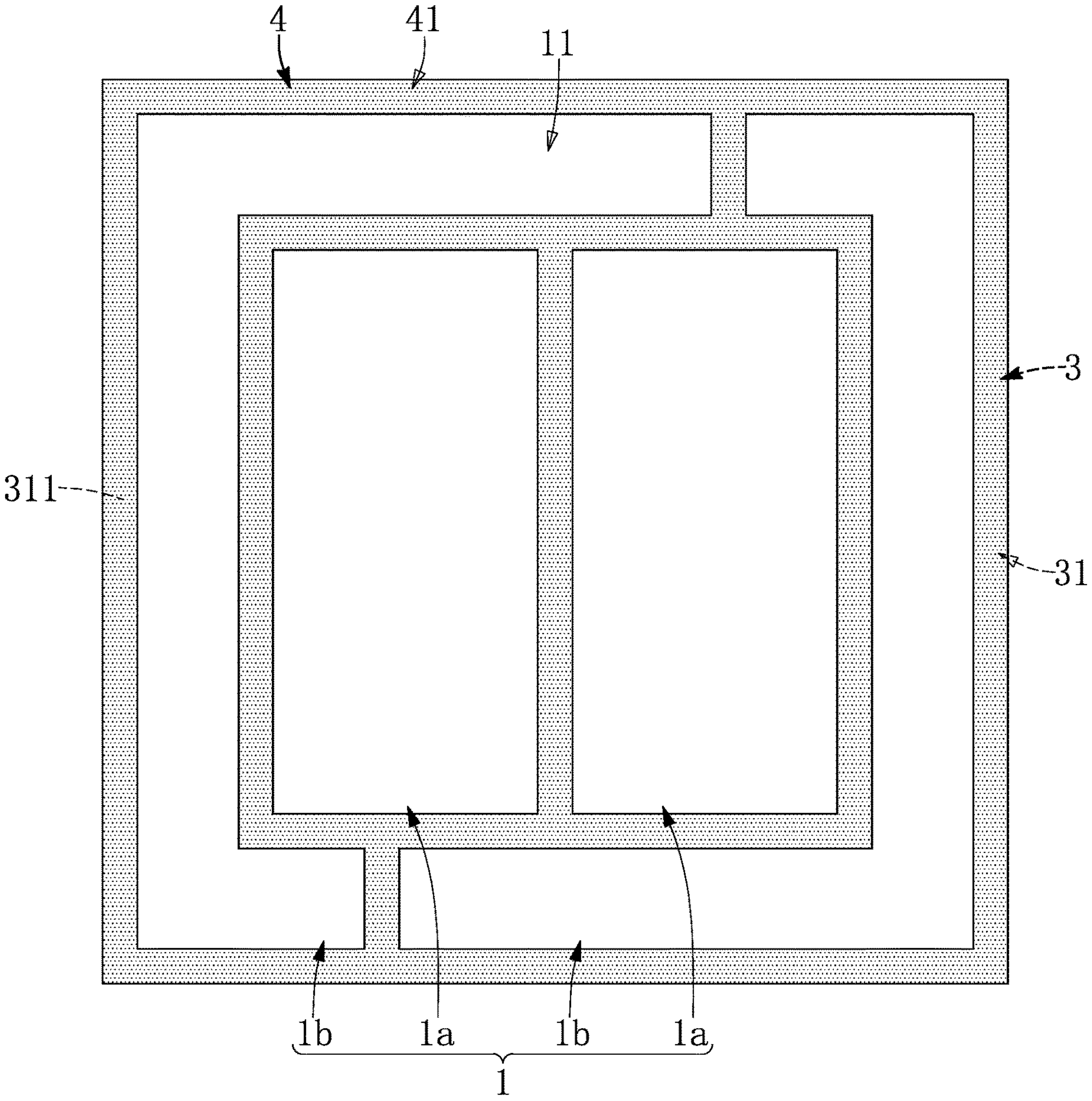
FIG. 8 is a schematic top view of the pre-mold DBC substrate according to a fourth embodiment of the present disclosure.

Referring to FIG. 6 and FIG. 7, a third embodiment of the present disclosure, which is similar to the first and second embodiments of the present disclosure, is provided. For the sake of brevity, descriptions of the same components in the first to third embodiments of the present disclosure will be omitted herein, and the following description only discloses different features among the first to third embodiments.

In the DBC step provided by the present embodiment, the ceramic board 3 is only eutectic-bonded to the first copper layer 1 through the first surface 31. In other words, the ceramic board 3 is provided without any copper layer on the second surface 32 thereof.

Specifically, other steps of the manufacturing method of the present embodiment different from the DBC step are identical to that of the first or second embodiment, and a structural difference of the pre-mold DBC substrate 100 of the present embodiment with respect to that of the first or second embodiment is provided without the second copper layer.

Fourth Embodiment

Referring to FIG. 8 to FIG. 11, a fourth embodiment of the present disclosure, which is similar to the first to third embodiments of the present disclosure, is provided. For the sake of brevity, descriptions of the same components in the first to fourth embodiments of the present disclosure will be omitted herein, and the following description only discloses different features among the first to fourth embodiments.

In the present embodiment, the first copper layer 1 includes a plurality of inside copper pads 1*a* spaced apart from each other and a plurality of outside copper pads 1*b* that are spaced apart from each other. The outside copper pads 1*b* are in a ring-shaped arrangement that surrounds the inside copper pads 1*a*. Moreover, as shown in the drawings, a quantity of the inside copper pads 1*a* is two, a quantity of the outside copper pads 1*b* is two, but the present disclosure is not limited thereto. Accordingly, in the pre-mold DBC substrate 100 provided by the present embodiment, a formation region of the pre-encapsulation layer 4 can be limited by forming the outside copper pads 1*b* in a ring-shaped arrangement, and the outside copper pads 1*b* can be in cooperation with the encapsulation layer 4 for jointly resisting a warpage.

Figure 9:
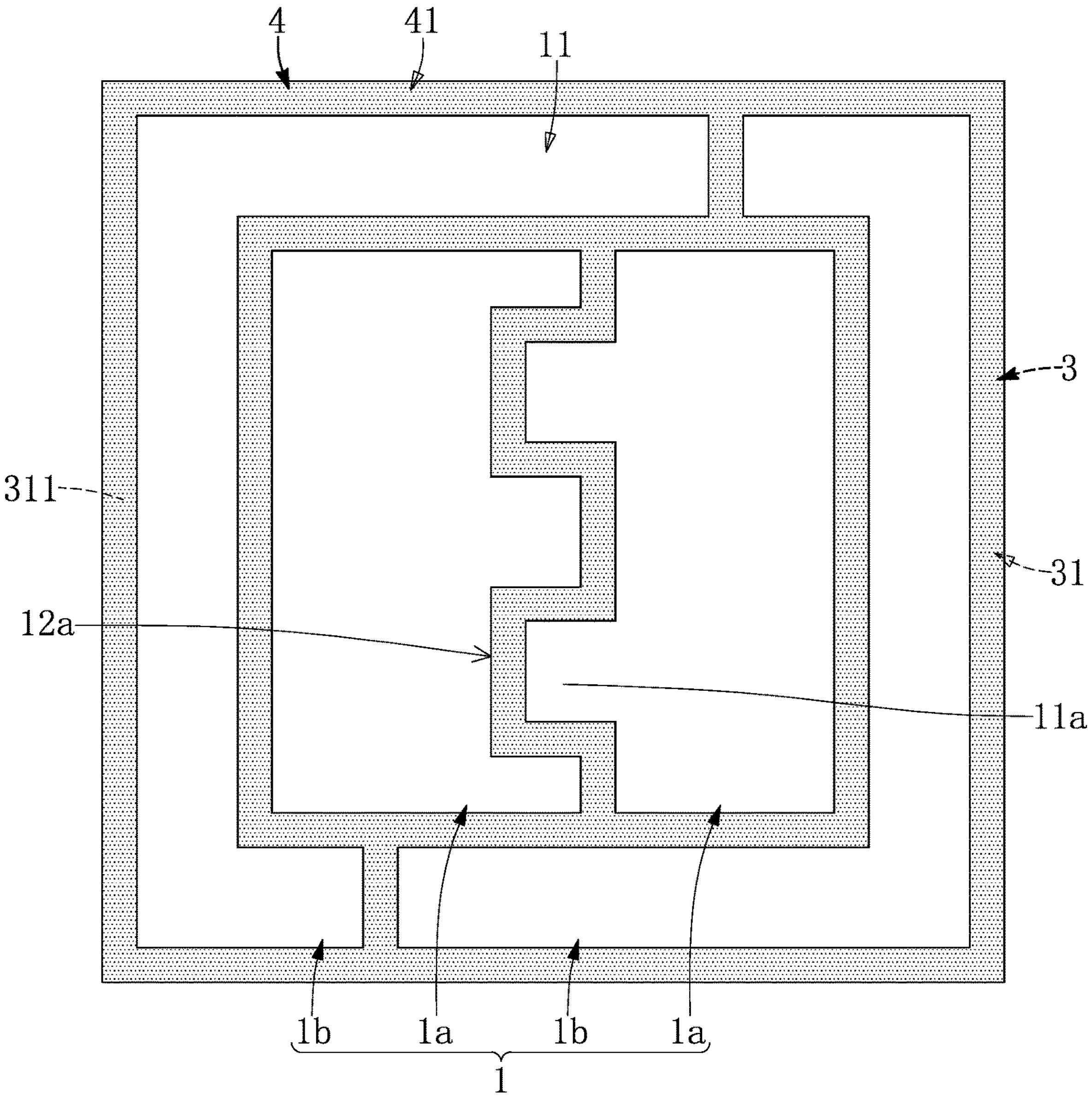
FIG. 9 is a schematic top view of the pre-mold DBC substrate in another configuration according to the fourth embodiment of the present disclosure.

As shown in FIG. 9, in two edges of the inside copper pads 1*a* facing and spaced apart from each other, one of the two edges defines at least one protrusion 11*a*, and another one of the two edges defines at least one slot 12*a* accommodating a part of the at least one protrusion 11*a* therein. Accordingly, in the pre-mold DBC substrate 100 provided by the present embodiment, the at least one protrusion 11*a* and the at least one slot 12*a* of the inside copper pads 1*a* can be in cooperation with each other for effectively reducing a stress concentrated in the pre-encapsulation layer 4 along a specific direction.

Figure 10:
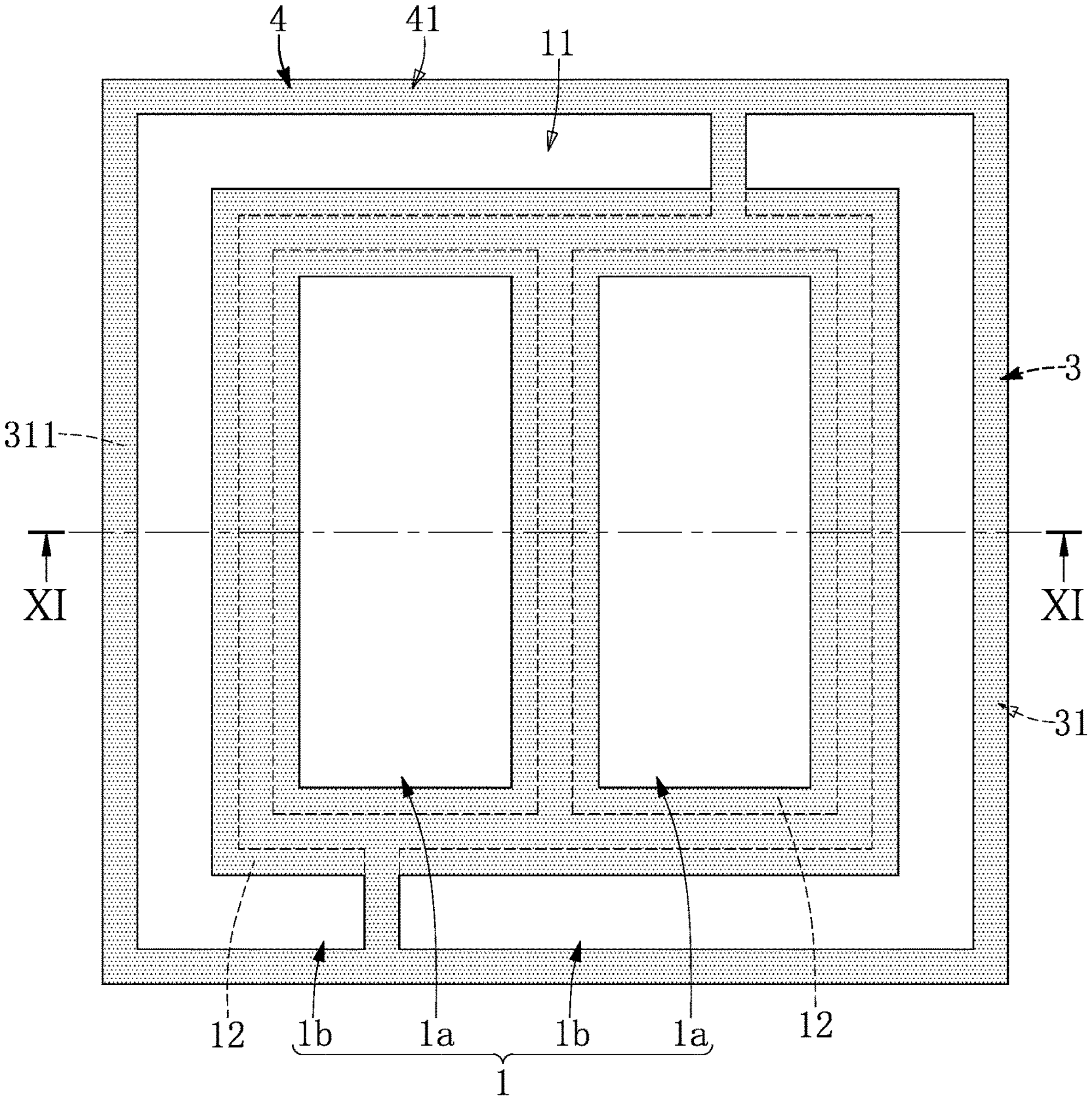
FIG. 10 is a schematic top view of the pre-mold DBC substrate in yet another configuration according to the fourth embodiment of the present disclosure.
Figure 11:
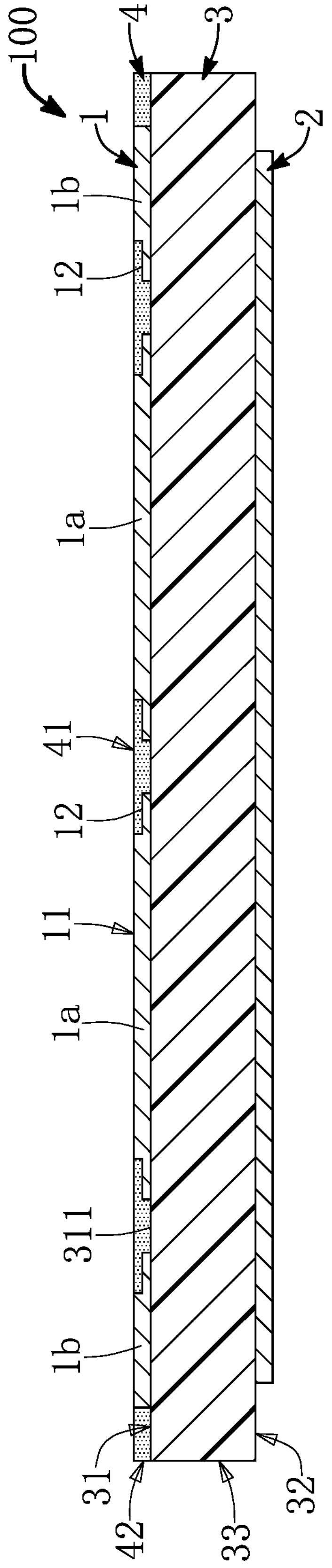
FIG. 11 is a schematic cross-sectional view taken along line XI-XI of FIG. 10.

In addition, as shown in FIG. 10 and FIG. 11, the first copper layer 1 can be formed in a half-etching manner, such that the edges of the inside copper pads 1*a* and inner edges of the outside copper pads 1*b* can each have a step-like structure and are embedded in the pre-encapsulation layer 4. Accordingly, in the pre-mold DBC substrate 100 provided by the present embodiment, the step-like structures of the first copper layer 1 can further increase the bonding strength between the first copper layer 1 and the pre-encapsulation layer 4.

Beneficial Effects of the Embodiments

In conclusion, in any one of the pre-mold DBC substrate and the manufacturing method provided by the present disclosure, the pre-encapsulation layer can be formed under a specific condition (e.g., the volume of the first copper layer being less than or equal to 80% of the volume of the second copper layer; or, the ceramic board being eutectic-bonded to only the first copper layer), such that the characteristic of the pre-encapsulation layer (e.g., the CTE of the pre-encapsulation layer being between the CTE of the ceramic board and the CTE of the first copper layer) enables the first copper layer (and/or the second copper layer) to avoid having a warpage and enables the ceramic board to avoid having a stress concentration, thereby increasing the reliability and durability of the pre-mold DBC substrate.

Moreover, in any one of the pre-mold DBC substrate and the manufacturing method provided by the present disclosure, at least one of the top side and the surrounding lateral side of the pre-encapsulation layer 4 can be roughened to have an average roughness (Ra) of at least 0.8 μm, thereby effectively increasing a bonding strength between the pre-encapsulation layer 4 and an encapsulation body when the pre-mold DBC substrate is applied in a subsequent package process.

Furthermore, the pre-mold DBC substrate provided by the present disclosure can further increase its reliability and durability through the structural layout of the first copper layer (e.g., the outside copper pads being in a ring-shaped arrangement, the inside copper pads having the at least one protrusion and the at least one slot that is in cooperation with the at least one protrusion, and the first copper layer having the step-like structures) covered by the pre-encapsulation layer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pre-mold direct bond copper (DBC) substrate, comprising:

a ceramic board having a first surface, a second surface opposite to the first surface, and a surrounding lateral surface that is connected to the first surface and the second surface;

a first copper layer eutectic-bonded to the first surface, wherein the first copper layer has a bonding surface arranged away from the first surface, and a part of the first surface not in contact with the first copper layer is defined as a layout region;

and a pre-encapsulation layer formed on the layout region in a molding manner to cover the first copper layer, wherein at least part of the bonding surface of the first copper layer is exposed from the pre-encapsulation layer, and wherein a coefficient of thermal expansion (CTE) of the pre-encapsulation layer is between a CTE of the ceramic board and a CTE of the first copper layer;

wherein the pre-encapsulation layer has a top side and a surrounding lateral side that is connected to the top side, and wherein the top side of the pre-encapsulation layer is higher than or coplanar with the bonding surface of the first copper layer relative to the first surface, and the surrounding lateral side of the pre-encapsulation layer is flush with the surrounding lateral surface of the ceramic board.

2. The pre-mold DBC substrate according to claim 1, wherein the first copper layer includes:

a plurality of inside copper pads spaced apart from each other; and a plurality of outside copper pads spaced apart from each other, wherein the outside copper pads are in a ring-shaped arrangement that surrounds the inside copper pads.

3. The pre-mold DBC substrate according to claim 2, wherein, in two edges of the inside copper pads facing and spaced apart from each other, one of the two edges defines at least one protrusion, and another one of the two edges defines at least one slot accommodating a part of the at least one protrusion therein.

4. The pre-mold DBC substrate according to claim 2, wherein edges of the inside copper pads and inner edges of the outside copper pads each have a step-like structure and are embedded in the pre-encapsulation layer.

5. The pre-mold DBC substrate according to claim 1, wherein at least one of the top side and the surrounding lateral side of the pre-encapsulation layer has an average roughness (Ra) of at least 0.8 μm.

6. The pre-mold DBC substrate according to claim 1, wherein the top side of the pre-encapsulation layer is limited to being coplanar with bonding surface of the first copper layer.

7. The pre-mold DBC substrate according to claim 1, wherein the pre-encapsulation layer includes:

a covering body formed on the layout region and covering the first copper layer; and a frame body extending from the covering body and protruding from the bonding surface, wherein the frame body has the top side and covers a part of the bonding surface.

8. The pre-mold DBC substrate according to claim 7, wherein the top side of the frame body is spaced apart from the bonding surface by a distance less than or equal to 100 μm, the frame body and the bonding surface jointly define a plurality of accommodating slots.

9. The pre-mold DBC substrate according to claim 1, further comprising a second copper layer eutectic-bonded to the second surface, wherein a volume of the first copper layer is less than or equal to 80% of a volume of the second copper layer, and the second copper layer is configured to be connected to a heatsink.

* * * * *